United States Patent
Kelly et al.

(10) Patent No.: US 12,431,766 B2
(45) Date of Patent: Sep. 30, 2025

(54) COOLANT SYSTEM

(71) Applicant: SAFRAN ELECTRICAL & POWER, Buckinghamshire (GB)

(72) Inventors: Anthony Kelly, Buckinghamshire (GB); Stephen Mark Hearn, Hertfordshire (GB); Paul David Flower, Buckinghamshire (GB)

(73) Assignee: SAFRAN ELECTRICAL & POWER, Blagnac (FR)

( * ) Notice: Subject to any disclaimer, the term of this patent is extended or adjusted under 35 U.S.C. 154(b) by 211 days.

(21) Appl. No.: 17/926,023

(22) PCT Filed: May 20, 2021

(86) PCT No.: PCT/GB2021/051219
§ 371 (c)(1),
(2) Date: Nov. 17, 2022

(87) PCT Pub. No.: WO2021/234390
PCT Pub. Date: Nov. 25, 2021

(65) Prior Publication Data
US 2023/0179064 A1    Jun. 8, 2023

(30) Foreign Application Priority Data
May 21, 2020   (GB) ..................... 2007615

(51) Int. Cl.
*H02K 9/19* (2006.01)
*G05D 16/00* (2006.01)

(52) U.S. Cl.
CPC ............. *H02K 9/19* (2013.01); *G05D 16/024* (2019.01)

(58) Field of Classification Search
CPC ......... H02K 9/19; G05D 16/024; G05D 16/00
See application file for complete search history.

(56) References Cited

U.S. PATENT DOCUMENTS

| | | | | |
|---|---|---|---|---|
| 4,851,723 A | * | 7/1989 | Barnhardt | F04C 14/22 310/64 |
| 5,196,746 A | * | 3/1993 | McCabria | H02K 9/24 310/58 |
| 2009/0159139 A1 | | 6/2009 | Cornet et al. | |

FOREIGN PATENT DOCUMENTS

| | | |
|---|---|---|
| EP | 3018550 A1 | 5/2016 |
| GB | 2571533 A | 9/2019 |
| GB | 2575495 A | 1/2020 |

OTHER PUBLICATIONS

International Search Report and Written Opinion, International Application No. PCT/GB2021/051219 dated Aug. 27, 2021, 12 pages.

* cited by examiner

*Primary Examiner* — Tulsidas C Patel
*Assistant Examiner* — Joshua Kiel M Rodriguez
(74) *Attorney, Agent, or Firm* — RANKIN, HILL & CLARK LLP

(57) ABSTRACT

A coolant system is arranged to be driven by a prime mover of an aircraft. The coolant system comprises a fluid circuit with a fluid therein, the fluid for cooling an electricity generator located in the fluid circuit. The fluid circuit comprises: a cooling path passing via at least one cooled component of the generator; a first fluid flow source configured to deliver a first fluid flow to the cooling path; a second fluid flow source configured to generate a second fluid flow; and a valve arrangement configured to selectively direct at least a proportion of the second fluid flow away from the cooling path in dependence on a measured operational parameter of the generator. An aircraft propulsion system and an aircraft can also include the coolant system.

12 Claims, 3 Drawing Sheets

COOLANT SYSTEM

TECHNICAL FIELD

The present invention relates to coolant systems. In particular, the invention relates to coolant systems with optimised pressure regulation, for use in cooling generators connected to aircraft engines.

BACKGROUND OF THE INVENTION

Electrical generators have both an operating temperature range, within which they can operate and an optimum temperature range, within which they tend to operate most efficiently. In use, electrical generators create heat due to inefficiencies in generation. Electrical generators are typically cooled by a circulating fluid to ensure that they are kept within their operating temperature range, and preferably kept within their optimum temperature range.

Aircraft propulsion systems typically comprise a prime mover in the form of an engine, such as a turbine or jet engine, which may be connected to an electrical generator. The electrical generator is typically formed of an assembly of magnetic circuit components, comprising a rotor and a stator. Generally, aircraft engine electrical generators are cooled using a fluid—typically oil for large aircraft generators—by circulating the fluid which is driven by a mechanical pump. The pump itself is typically driven from the rotor shaft of the electrical generator. In other implementations, such as smaller generators, air cooling can be implemented using a fan.

When a variable speed generator is operating at lower speeds, for a given electrical load, currents in the windings of the generator rotor will be higher, which in turn generate more heat due to resistance. Therefore, more cooling is required at these lower speeds. Similarly, if the generator is operating at lower speeds, the rotational speed of the pump will also be lower, and thus the rate at which the oil flows around the circuit will be lower. Conversely, when the generator is operating at higher speeds, currents are lower, and thus less heat is generated. However, the drive speed delivered at the pump is higher, increasing the rate at which the oil flows around the circuit. In order to provide sufficient cooling at the low-flow-rate, high current operating conditions, the coolant pump will typically provide well over the flow rate required for cooling at high speeds.

In known systems, oil flow through the generator is regulated by using a pressure relief valve at a point where the oil is first used to cool the generator. This ensures that oil flow through the generator is kept within a selected design flow rate range across the entire speed range, by venting any excess oil back to an oil reservoir or sump. Typically, this pressure relief valve is set to around 60 psi (pounds per square inch). However, in known systems, it has been found that a significant proportion of the pressure drop in the coolant system, which can be in excess of 120 psi when operating the engines at cruise speeds and higher, occurs in the remotely mounted cooler and associated pipework of the cooling system. Since the hydraulic power provided by the pump is the flow rate multiplied by the outlet pressure, any reduction in this pressure drop will lead directly to a reduction in pump power consumption and thus an improvement in efficiency.

UK Patent Application GB2571533A provides a coolant system comprising a fluid control device. The fluid control device is configured to selectively direct at least a proportion of the flow of fluid provided by the pump away from a cooler in dependence on a measured pressure in the fluid circuit. In this way, the coolant system regulates the flow of fluid such that only the minimum amount of fluid required will pass through the cooler, while the remaining fluid is directed away from the cooler to a reservoir, for example.

There exists a need for further improvements to pressure regulation in coolant systems.

SUMMARY OF THE INVENTION

The inventors have identified that improvements can be made to known coolant systems for aircraft generators. These improvements may be best understood with reference to a known coolant system in which coolant fluid is circulated around a fluid circuit comprising a heat exchanger, a cooled component, a reservoir (i.e. a sump) and a pressure relief valve configured to direct excess cooled fluid to the reservoir instead of to the generator.

The inventors have identified several issues with this known system. One issue arises from the pressure relief valve being downstream of the cooler. In this prior arrangement, the pump consumes unnecessary power in pumping fluid through the cooler that will be redirected straight to the reservoir before cooling components of the generator, thereby reducing the efficiency of the coolant system. A further issue with this type of arrangement is that it requires a reservoir with a relatively large capacity to accommodate the flow of coolant in the circuit.

According to the invention, there is provided a coolant system of a generator arranged to be driven by a prime mover of an aircraft, the coolant system comprising:
  a fluid circuit with a fluid therein, the fluid for cooling an electricity generator located in the fluid circuit;
  the fluid circuit comprising a cooling path passing via at least one cooled component of the generator,
  a first fluid flow source configured to deliver a first fluid flow to the cooling path,
  a second fluid flow source configured to generate a second fluid flow, and
  a valve arrangement configured to selectively direct at least a proportion of the second fluid flow away from the cooling path in dependence on a measured operational parameter of the generator.

The system may be further configured so that at least a proportion of the first fluid flow can be directed away from the cooling path in dependence on a measured operational parameter of the generator. This may be provided in addition to the system being configured so that a proportion of the second fluid flow can be directed away from the cooling path in dependence on a measured operational parameter of the generator. The system is preferably configured such that the first fluid flow is constantly delivered to the cooling path in operation.

The invention provides a solution to the issues identified above in known coolant systems. In particular, the valve arrangement being configured to direct fluid away from the cooling path, that is, before the fluid flows to the at least one cooled component of the generator, reduces the power consumption of the pump by reducing the amount of fluid flowing towards the cooling path. Furthermore, since the sizing of the reservoir is proportional to the flow rate of fluid around the cooling path, reducing the maximum flow rate through the cooling path allows for a smaller reservoir to be used, thereby decreasing the weight of the coolant system. This provides the additional advantage of reducing the dry weight of the generator and allowing it to fit into a smaller space. Furthermore, this arrangement reduces the amount of oil required in the system such that there is less oil to be dealt with in the case of rupture of the reservoir, for example. Since the two fluid flows are delivered by two separate fluid flow sources, their flows can be controlled independently from one another to thereby improve the efficiency of the fluid flow around the fluid circuit.

The at least one cooled component of the generator may be a rotor or a stator of the generator, or both the rotor and stator of the generator. Fluid from the cooling path, that may have been cooled by passing through a cooler, may be directed first to the rotor and then to the stator. In an alternative arrangement, fluid can be directed first to the stator and then to the rotor. In a further alternative arrangement, fluid can be directed to both the rotor and the stator simultaneously.

The first and second fluid flow sources may be comprised in a single pump unit having separate outlets for each fluid flow source. The first and second fluid flow sources may be comprised in separate pumps or pump units. Separate pump elements providing separate fluid flow sources may be housed in a single pump housing. The separate pumps or pump units may be driven from a common mechanical or electrical input or from separate mechanical or electrical inputs.

The coolant system may be configured such that the first fluid flow is continuously directed to the cooling path. This provides the advantage that at least a proportion of fluid flows to the coolant path irrespective of the state of the valve arrangement. In particular, when the valve arrangement is directing all of the second fluid flow away from the cooling path, the first fluid flow being continuously directed to the cooling path ensures that some fluid is still supplied to the cooling path to be cooled and to then perform its function of cooling components of the generator. In particular, this configuration ensures that if the valve arrangement fails in such a way that it directs all of the second fluid flow away from the cooling path, for example to the reservoir, fluid will still be supplied to the generator to perform its cooling function and, in some arrangements, to supply lubrication to components of the generator, such as the rotor bearings.

The valve arrangement may comprise a dump valve. The dump valve may be configured to selectively direct at least a proportion of the second fluid flow away from the cooling path, which may be in dependence on the measured operational parameter of the generator. The measured operational parameter of the generator may be a measured pressure in the fluid circuit. This allows a proportion of fluid to be directed away from the cooling path, for example to the reservoir, based on a measured pressure from a point in the fluid circuit. The measurement point in the fluid circuit may be remote from the valve arrangement. The cooling path may comprise a cooler, such as a heat exchanger. The measurement point may be downstream of the cooler. As such, the dump valve may change its state based on the pressure of the fluid between the cooler and the cooled components of the generator. This provides the advantage that when the pressure at the measurement point is high, the dump valve will change its state to direct fluid from the second fluid flow away from the cooler, for example to the sump, to thereby control the flow rate of fluid in the fluid circuit.

The second fluid flow source may be configured to direct the second fluid flow to a first fluid circuit branch and a second fluid circuit branch. The first fluid circuit branch may be configured to deliver fluid flow to the dump valve. The second fluid circuit branch may be configured to combine fluid from the second fluid flow with the first fluid flow. This arrangement provides the advantage of further splitting the flow of the second fluid flow in order to control the second fluid flow using the valve arrangement. In particular, this arrangement provides one way in which to selectively direct fluid away from the cooler via the dump valve. Further, this arrangement provides a path for the second fluid flow to combine with the first fluid flow such that at least a proportion of the second fluid flow may be directed to the cooling path to thereby contribute to cooling the cooled components of the generator. In this way, when the dump valve is in a state such that it is not directing fluid away from the cooling path, for example when the pressure at the measurement point is low, fluid from the second fluid flow source may preferentially be directed down the second fluid circuit branch. In this way, when the fluid flow rate at the measurement point in the fluid circuit is low, for example when the generator is operating at lower speeds during taxiing of an aircraft, a greater proportion of the second fluid flow can be combined with the first fluid flow to increase the overall flow rate of fluid to thereby accommodate the increased heat generation of the generator when operating at lower speeds.

The valve arrangement may comprise a non-return valve. The non-return valve may be located in the second fluid circuit branch. The non-return valve may be configured to selectively direct fluid from the second fluid flow to combine with the first fluid flow, in order to direct a combination of the first and second fluid flows to the cooling path. This provides the advantage of controlling the amount of fluid flowing down the second fluid circuit branch. In particular, when the dump valve is in a state that allows fluid to be directed away from the cooling path, which may be when there is less heat generation in the generator when it is operating at higher speeds, the non-return valve may prevent fluid from the second fluid flow being directed through the second fluid circuit branch. In particular, in these circumstances in which the flow rate of the fluid is high, the back pressure from fluid in the first fluid flow may maintain the non-return valve in its closed state. In this way, when there is a reduced need for cooling the generator, the second fluid flow is preferentially directed down the first fluid circuit branch to the dump valve, to thereby be directed away from the cooling path, for example to the reservoir.

The valve arrangement may be configured to selectively direct at least a proportion of the second fluid flow towards a reservoir, which may be in dependence on the measured operational parameter of the generator.

At least one of the first and second fluid flow sources may be driven via the generator.

According to another aspect of the invention, there is provided an aircraft propulsion system comprising a coolant system as described hereinabove.

According to another aspect of the invention, there is provided an aircraft comprising an aircraft propulsion system, the aircraft propulsion system comprising a coolant system as described hereinabove.

BRIEF DESCRIPTION OF THE DRAWINGS

Further features and advantages of the present invention will become apparent from the following description of embodiments thereof, presented by way of example only, and by reference to the drawings, in which.

DETAILED DESCRIPTION

Figure 1:
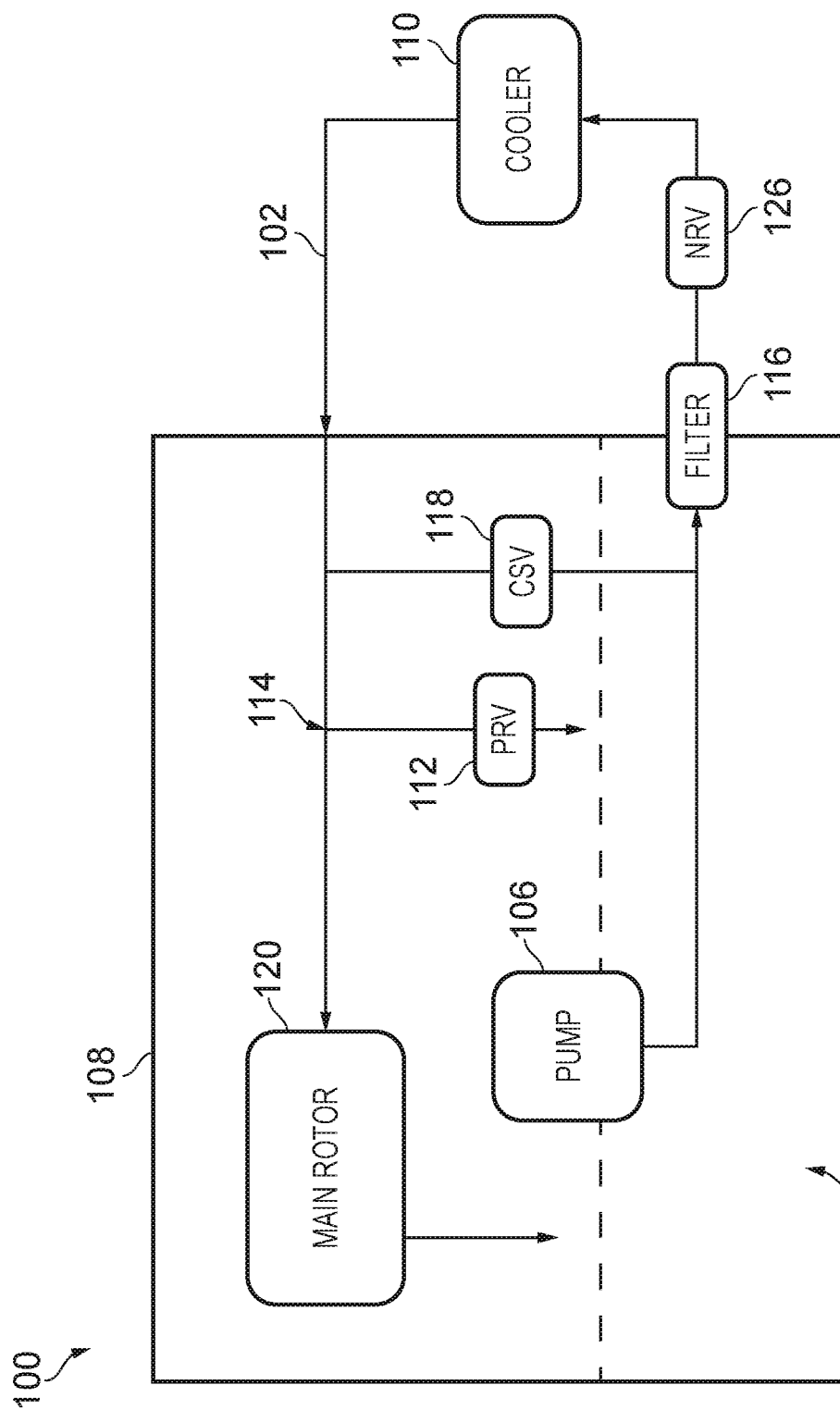
FIG. 1 is a schematic diagram illustrating a coolant system in accordance with the prior art.

FIG. 1 illustrates a coolant system 100 which is known in the prior art for use in aircraft propulsion systems. The coolant system 100 comprises a coolant circuit 102. The coolant circuit 102 contains a coolant fluid (not shown) which can be circulated around the coolant circuit 102. In this illustrated example, the coolant can be or comprise oil, although any suitable coolant can be used. The coolant is typically a liquid, a component of which may comprise oil or other lubricating fluid. The coolant may act also as a lubricant for parts of the generator. The coolant can be circulated to and from a coolant reservoir 104, commonly known as a sump.

The coolant system 100 also comprises an electrical generator 108, which is cooled by the coolant circuit 102. In this respect, the electrical generator 108 is arranged in thermal communication with the coolant circuit 102 such that excess heat can be transferred from the electrical generator 108 to the coolant fluid. Typically, to achieve this effect, the coolant runs through one or more components of the generator, and more typically through one or more heat generating components of the generator. Heat generating components of the generator are typically those which generate heat due to electrical resistance during operation of the generator. The electrical generator 108 typically comprises a rotating component, known as a rotor 120, and/or a stationary component, known as a stator (not shown). It is these components in particular that the coolant circuit 102 may be used to cool, though other components of the generator may be cooled in addition to or in place of those components of the generator.

The coolant system 100 also comprises a cooler 110, typically known as a heat exchanger, located in the coolant circuit 102. This is typically located between the pump 106 and the generator 108. The pump 106 is configured to pump the coolant fluid towards the generator 108 through the cooler 110. This allows the cooled fluid from the cooler 110 to flow on to the generator to perform its cooling function. A pressure relief valve (PRV) 112 is provided at the point at which the coolant circuit 102 begins to cool the generator 108. This pressure relief valve 112 operates based on a pressure at its location 114. This point can in this instance be considered a measured pressure point 114 for the pressure relief valve 112 of the prior art arrangement. It is the location of the pressure relief valve 112 and may be co-located with a point at which the coolant circuit 102 begins to cool the generator 108. The pressure relief valve 112 is configured to keep the pressure of the coolant fluid substantially constant at this point, or at least to 'cap' the pressure at an upper threshold value, by opening when a chosen pressure level is reached, typically, but not exclusively, 60 psi, for example. By allowing excess coolant fluid from the coolant circuit 102 to return to the reservoir 104, the pressure relief valve 112 provides a substantially constant pressure drop between the point at which the coolant enters the generator and the reservoir/pump inlet. This results in a substantially constant coolant flow through the generator, which gives a more predictable rate of removal of heat from the generator.

A filter 116 is also provided to remove unwanted particulates from the coolant fluid. A non-return valve (NRV) 126 may be provided between the filter 116 and the cooler 110. A cold start valve (CSV) 118 may also be provided to enable some of the coolant fluid to bypass the cooler 110 under certain conditions. Given that cold oil is more viscous and, therefore, requires more power from the pump 106 to be driven around the coolant circuit 102 through the cooler 110, the cold start valve 118 helps to prevent overloading the system 100, for example, by enabling some of the coolant fluid to bypass the cooler 110 to prevent excess pressure build up on the upstream side of the cooler 110, particularly in cold conditions, though the valve may function under any circumstance causing pressure build up in the cooler, such as a blockage of the cooler.

The prior art coolant system 100 described above is typical of a coolant system in which the fluid pressure is regulated by a standard pressure relief valve. In this instance the pressure relief valve is located substantially at the point at which the coolant circuit enters the cooled components of the generator and begins to cool the cooled components of the generator 108. However, it has been identified that the majority of the pressure drop in a typical coolant system 100 occurs in the cooler 110 in high speed modes of operation, i.e. at the cruising speed of an aircraft in which the generator may be mounted. At higher speeds, the flow rate increases, which in turn causes the pressure at the generator inlet to increase. Consequently, the pressure relief valve opens further to compensate for this increase and thereby keep the flow rate constant. This excess of flow rate at the generator, where the pressure relief valve is located, results in coolant being returned to the sump while bypassing the generator. However, the diverted coolant has still already passed through the cooler once it reaches the bypass valve 112. In order to push excess coolant fluid through the cooler, a large proportion of the power consumed by the pump 106 is wasted driving a high coolant flow rate through a high pressure drop in the cooler 110. One way to try to avoid this drawback of lost power in the cooler would be to move the pressure relief valve to the pump outlet, but this would bring the drawback that, when pressure drops in the cooler are high, for example due to lower temperatures and higher viscosity of the coolant, the pressure relief valve would operate and insufficient coolant flow would be provided to the generator. So, since the pressure drop in the cooler of the system will vary with coolant viscosity, and thus temperature, it is not possible to simply move the pressure relief valve to the pump outlet or another location before the cooler, as this would leave insufficient coolant pressure, at the point at which the coolant enters the cooled components of the generator, to drive sufficient coolant flow through the cooled components of the generator.

Systems according to the invention have been developed to address the problems of excess power being consumed at cruise speeds by excessive coolant flow through the cooler 110. Furthermore, embodiments of the invention address the above problem without introducing a single point of failure into the coolant system. As described above, at high engine speeds, typically, around half of the coolant reaching the pressure relief valve of the prior art system may be returned directly to the oil reservoir without passing through the cooled generator components. This means that a significant proportion of the pressure drop in the cooler is only used to push excess oil through the cooler and on round the circuit to the pressure relief valve, without cooling the generator. This can mean that in certain operational circumstances as little as 10% of the pump power is used to produce useful cooling work, with much of the rest being used to drive excess flow through the cooler.

Figure 2:
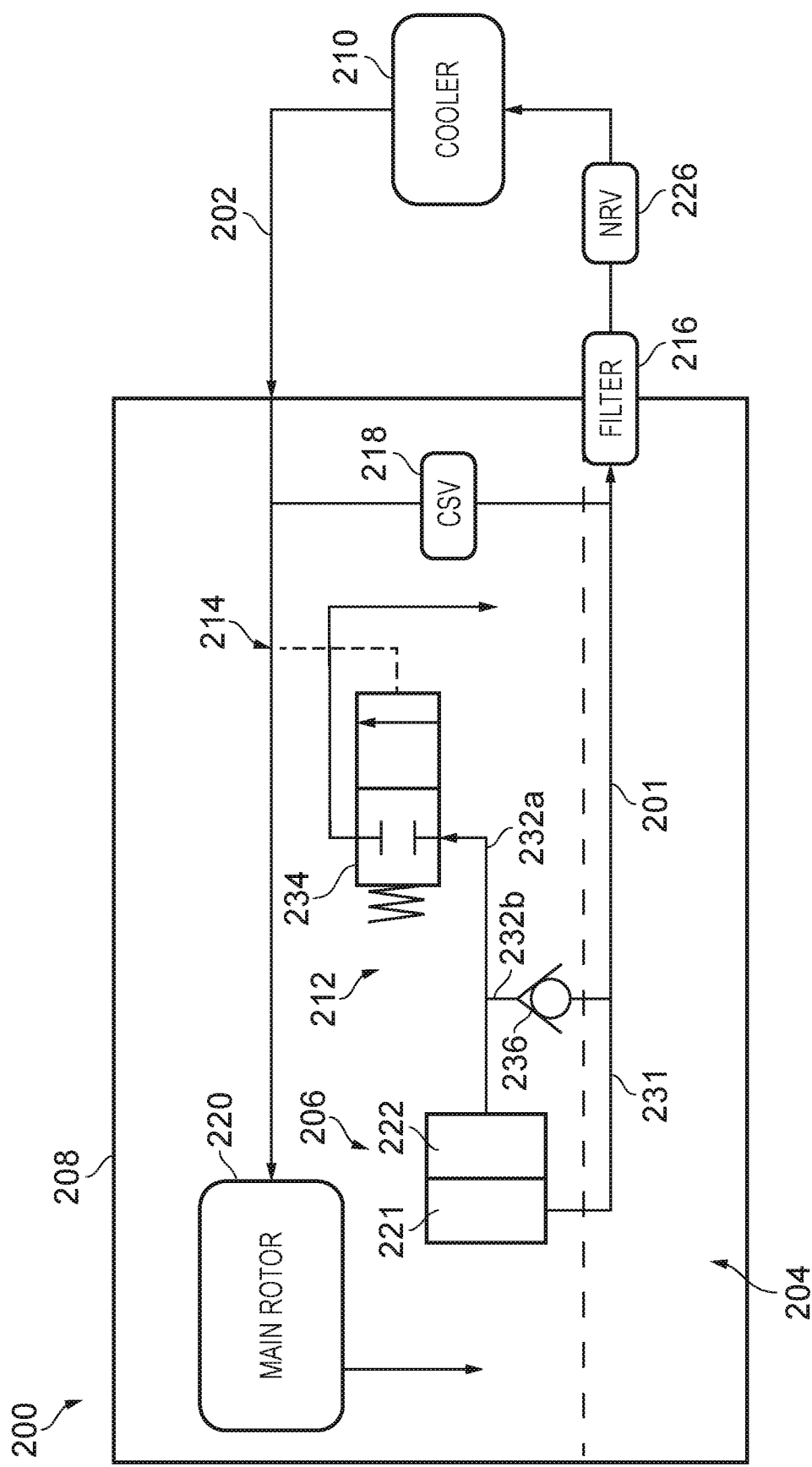
FIG. 2 is a schematic diagram illustrating a coolant system in accordance with an embodiment of the invention.
Figure 3:
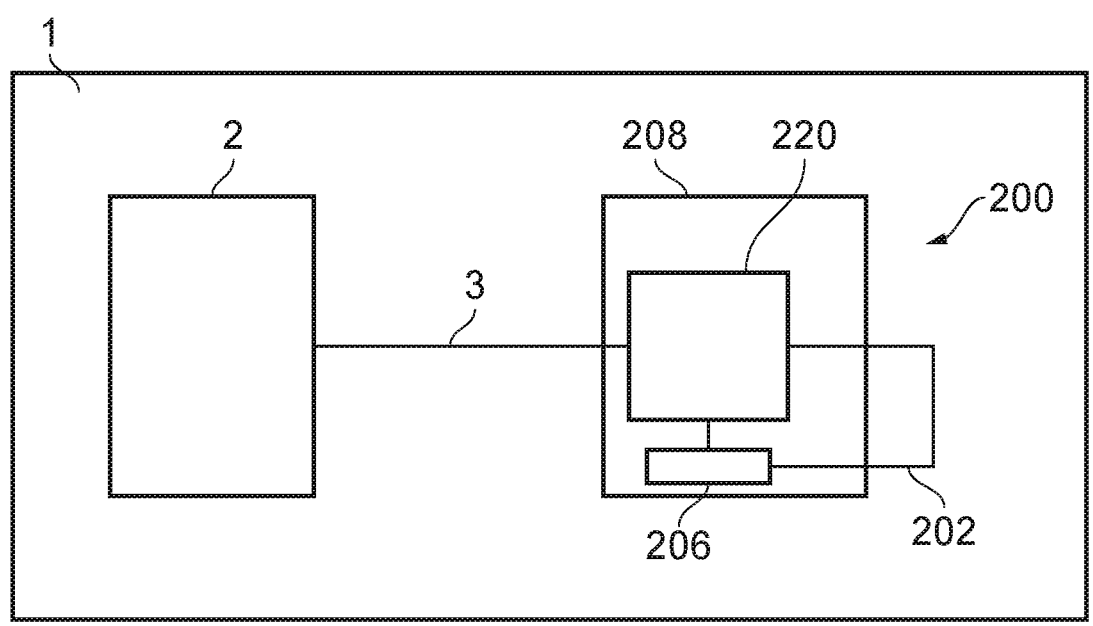
FIG. 3 is a schematic diagram illustrating an aircraft and an aircraft engine assembly according to embodiments of the present invention.

FIGS. 2 and 3 show a coolant system 200 in relation to which embodiments of the invention will be described. The coolant system 200 can be comprised in a generator 208, arranged to be driven by a prime mover of an aircraft such as an aircraft engine 2, of an aircraft 1. The coolant system 200 comprises a fluid circuit 201. The fluid circuit contains a coolant fluid (not shown) which can be circulated around the fluid circuit 201 via a first fluid flow source 221 and a second fluid flow source 222, which may be comprised in a pump 206. In this illustrated example, the coolant can be oil, which can be circulated to and from a coolant reservoir 204, although any suitable coolant fluid can be used, typically a liquid coolant. The generator 208 and first and second fluid flow sources 221, 222 may be driven by the aircraft engine 2. The drive from the engine may optionally be provided via an output gearbox, preferably via an input drive shaft 3.

The electrical generator 208 in the coolant system is cooled by the fluid circuit 201. In this respect, the electrical generator 208 may be arranged in or near the fluid circuit 201 such that excess heat can be transferred from the electrical generator 208 to the coolant fluid. Cooled components of the electrical generator may therefore be in close thermal contact with the coolant in the fluid circuit. This is typically achieved by passing the coolant through electrical and/or magnetic circuit components of the generator to draw heat from them into the coolant. The electrical generator 208 comprises a main rotor 220 and a stator (not shown). In this embodiment, only the rotor 220 is shown to be located in the fluid circuit 201 but it will be appreciated that the stator may be located in the fluid circuit 201 in addition to, or instead of, the rotor 220. In this respect, the fluid circuit 201 may be firstly directed to the rotor 220 and then to the stator, or firstly to the stator and then to the rotor 220, or to both the stator and rotor 220 in parallel.

The pump 206 can be configured to circulate the coolant flow around the fluid circuit 201 via the first and second fluid flow sources 221, 222. The fluid circuit 201 comprises a cooling path 202. The cooling path 202 comprises a cooler 210. The cooling path 202 is configured to direct fluid flow from the pump 206 to the rotor 220 via the cooler 210. In this way, fluid cooled in the cooler 210 can be directed to the rotor 220 to perform its cooling function.

The cooling path 202 may also comprise a filter 216, preferably provided between the pump 206 and the cooler 210, to remove unwanted particulates from the coolant fluid. The cooling path 202 may further comprise a cold start valve (CSV) 218, which may be a cold start pressure relief valve, to direct some of the coolant fluid such that it bypasses the cooler 210 in situations where high viscosity of the coolant, or any blockage in the cooler, causes excessive pressure in the cooler 210. The cooling path 202 may further comprise a non-return valve (NRV) 226, preferably between the filter 216 and the cooler 210.

Preferably, the pump 206 is powered by the generator 208 via a pump drive shaft (not shown). In this way, the rotational speed at which the pump 206 is driven may be proportional to the generator speed, which may itself be proportional to the aircraft engine speed. This would be the case if a direct drive connection is provided from the engine to the generator and to the pump, which may be the case in a typical application. The first fluid flow source 221 is configured to generate a first fluid flow to the cooling path 202. In the illustrated example, the first fluid flow source 221 is comprised in the pump 206 and can direct fluid via a first pump output 231 to the fluid circuit 201 and the cooling path 202. The second fluid flow source 222 is configured to generate a second flow. In the illustrated example, the second fluid flow source 222 is comprised in the pump 206 and can direct fluid to a valve arrangement 212 via a second pump output 232. The first fluid flow and second fluid flow are therefore separate flows of fluid that can be driven by the pump 206. The first and second fluid flow sources 221, 222 may be driven by the pump drive shaft. While the first and second fluid flow sources 221, 222 have been described as being comprised in a single pump 206 driven by the pump drive shaft, it will be appreciated that the first and second fluid flow sources 221, 222 may instead be comprised in first and second pumps respectively. Such first and second pumps may be powered by a single drive shaft, or may be powered separately by other means. One or both of the fluid flow sources may comprise a variable displacement pump arrangement, in which the displacement of a fluid flow source is configured to vary based on a measured fluid pressure in the fluid circuit. Furthermore, while two fluid flow sources have been described herein, it will be appreciated that more than two fluid flow sources may be employed.

The first fluid flow source 221 can direct fluid from the reservoir 204 directly to the cooling path 202 via the first pump output 231. The second fluid flow source 222 can direct fluid from the reservoir 204 to the valve arrangement 212 via the second pump output 232. In the illustrated example, the first pump output 231 directs fluid from the pump 206 to the cold start valve 218 and to the filter 216, non-return valve 226 and cooler 210. In this way, the first fluid flow source 221 is able to direct the first fluid flow, which is separate to the second fluid flow, continuously to the cooling path 202 via the first pump output 231.

The valve arrangement 212 is configured to selectively direct at least a proportion of the second fluid flow away from the cooling path 202 in dependence on a measured operational parameter of the generator 208. The operational parameter of the generator may be a measured pressure in the fluid circuit 201, such as the pressure at a measurement point 214. The measured operational parameter may instead or additionally be a measurement of a temperature of a part of the generator or its cooling system, or of heat dissipated by the generator 208. Further, the operational parameter may comprise a speed of the generator or an engine driving the generator. The operational parameter may further comprise an electrical load on the generator. For example, if a generator is driving a high electrical load more heat may be generated in the generator, and further, if a high electrical load is demanded when engine speed is low, even greater heat may be generated due to high currents in the generator. As such, the measured operational parameter may include any or all of the above measureable parameters.

In the illustrated example, the second pump output 232 comprises a first branch 232a and a second branch 232b. A dump valve 234 may be provided in the valve arrangement 212. The dump valve 234 may be a pressure piloted diversion valve located in the first branch 232a of the second pump output 232. The dump valve 234 may be configured to selectively direct fluid from the pump 206 to the reservoir 204 based on a measured pressure at a pressure measurement point 214 located in the fluid circuit 201. In this embodiment, the pressure measurement point 214 is located at the input to the main rotor 220, downstream of the cooler 210. However, it will be appreciated that the measurement point may be located elsewhere in the fluid circuit 201, such as between the rotor and the stator, for example. Furthermore, the dump valve 234 may instead be servo-controlled. The servo may therefore be controlled based upon a control signal, which may be electrical or electronic. The control signal may be based upon a measured pressure in the coolant system 200, or may additionally or alternatively be based upon other factors such as those described above. This can, for example, allow for varying flows of coolant to be delivered through the cooling path 202 in dependence on a variety of factors, such as a varying electrical load at the generator which may cause variations in the amount of heat generated.

The second branch 232b of the second pump output 232 can direct fluid from the second pump output 232 towards a point in the fluid circuit 201 at which fluid from the second fluid flow can combine with the first fluid flow. From this point, the first and second fluid flows can together be directed towards the cooler 210 in the cooling path 202. A non-return valve 236 may be provided in the valve arrangement 212. This may be provided in the second branch 232b of the second pump output 232. The non-return valve 236 may be configured to selectively direct fluid from the pump 206 to the cooling path 202 in dependence on the resultant pressure of the fluid from either side of the non-return valve 236. While the valve arrangement 212 has been described and illustrated as being a separate component from the pump 206, it will be appreciated that the valve arrangement 212 may be incorporated into the pump 206.

The valve arrangement 212 can be configured such that the coolant system 200 provides the required flow rate to cool the generator 208, without providing a flow rate that is significantly higher than what is required. In this way, the flow rate of coolant flowing through the cooler is better matched to the demand of the generator. As mentioned, when the generator is operating at low speed, the pump will also operate at low speed but the heat generation from the generator will be high. At this point, a high flow rate of coolant flowing through the cooler is required to sufficiently cool the generator. This may be achieved by the dump valve 234 being able to prevent the flow of the second fluid flow to the reservoir 204 when the pressure at the pressure measurement point 214 is low. Therefore, when the flow rate, and therefore pressure, of the fluid at the inlet of the rotor 220 is low, the dump valve 234 is closed. With the dump valve 234 closed, fluid from the second pump output 232 is directed down the second branch 232b and towards the non-return valve 236. Then, the second flow of fluid flows through the non-return valve 236 and combines with the first fluid flow from the first pump output 231. The combined flow of the first fluid flow and the second fluid flow then flows towards the cooling path 202 to be cooled by the cooler 210. Therefore, when the generator is operating at low speeds, fluid from the second pump output 232 in addition to fluid from the first pump output 231 is directed to the cooling path 202 to be supplied to the rotor 220 to perform its cooling function.

When the generator is operating at high speed, the pump will also operate at high speed but the heat generation from the generator will be low. At this point, less coolant is required to cool the generator. In certain prior coolant systems, surplus oil is diverted to the reservoir via a pressure relief valve at the rotor inlet such that the oil flow rate through the generator remains constant. However, since the diversion of the oil flow occurs downstream of the cooler, the flow rate through the cooler remains high, and since the pressure drop in the cooler is proportional to the square of the flow rate, the power consumption of the pump can be significant at these high speeds.

In order to reduce the pump power consumption while avoiding the introduction of a single point of failure, the present invention is configured to divert fluid flow at a point that is upstream of the cooling path 202, while ensuring that a portion of the pump output is continuously directed toward the cooling path 202. In this way, the flow of fluid directed to the cooler 210 is reduced, thereby reducing the pressure drop in the cooler 210 and decreasing the power consumption of the pump 206. In the event that the valve arrangement 212 fails in such a way that it diverts all of the second fluid flow away from the cooler and towards the reservoir, for example, sufficient coolant fluid may continue to be supplied to the rotor 220 via the first pump output 231. Therefore, the first fluid flow from the first pump output 231 can provide a continuous flow of fluid to the cooling path 202 irrespective of the state of the valve arrangement 212. Overall, the coolant system having two separate flows of fluid reduces the risk of a situation in which the coolant system is unable to provide any cooling to the generator. For systems in which this same fluid flow is used for lubrication of generator components, such as the rotor bearings, this arrangement reduces the likelihood of such components being without lubrication.

In addition to reducing the power consumption of the pump 206, this invention provides an additional advantage of allowing the size of the reservoir 204, or sump, to be reduced. Since the sizing of the reservoir is proportional to the flow rate of fluid around the cooler 210, reducing the maximum flow rate through the cooler 210 allows for a smaller reservoir 204 to be used. In this way, the as-installed weight of the coolant system 200 and of a generator 208 in which the coolant system 200 is installed, may be reduced.

FIG. 3 illustrates the coolant system 200 comprised in the generator 208, arranged to be driven by a prime mover of an aircraft such as an aircraft engine 2, of an aircraft 1. An aircraft propulsion system can therefore comprise a prime mover, a generator and the coolant system 200.

Various modifications, whether by way of addition, deletion and/or substitution, may be made to all of the above described embodiments to provide further embodiments, any and/or all of which are intended to be encompassed by the appended claims.

The invention claimed is:

1. A generator, arranged to be driven by a prime mover of an aircraft and comprising a coolant system, the coolant system of the generator comprising:
    a fluid circuit with a fluid therein, the fluid for cooling at least one cooled component of the generator located in the fluid circuit in the generator;
    the fluid circuit comprising a cooling path passing via the at least one cooled component in the generator, the generator further comprising:
    at least one pump for providing a first fluid flow source configured to deliver a first fluid flow to the cooling path,
    and a second fluid flow source configured to generate a second fluid flow, and
    a valve arrangement configured to selectively direct at least a proportion of the second fluid flow away from the cooling path in dependence on a measured operational parameter of the generator.

2. The generator according to claim 1, configured such that the first fluid flow is continuously directed to the cooling path.

3. The generator according to claim 1, wherein the valve arrangement comprises a dump valve configured to selectively direct at least a proportion of the second fluid flow away from the cooling path in dependence on the measured operational parameter of the generator.

4. The generator according to claim 1, wherein the second fluid flow source is configured to direct the second fluid flow to a first fluid circuit branch and a second fluid circuit branch.

5. The generator according to claim 4, wherein the first fluid circuit branch is configured to deliver fluid flow to a dump valve of the valve arrangement, and wherein the second fluid circuit branch is configured to combine fluid from the second fluid flow with the first fluid flow.

6. The generator according to claim 4, wherein the valve arrangement comprises a non-return valve, located in the second fluid circuit branch, and configured to selectively direct fluid from the second fluid flow to combine with the first fluid flow, in order to direct a combination of the first and second fluid flows to the cooling path.

7. The generator according to claim 1, wherein the valve arrangement is further configured to selectively direct at least a proportion of the second fluid flow towards a reservoir in dependence on the measured operational parameter of the generator.

8. The generator according to claim 1, wherein at least one of the first and second fluid flow sources is driven via the generator.

9. The generator according to claim 1, wherein the measured operational parameter of the generator is a measured pressure in the fluid circuit.

10. The generator according to claim 9, wherein the measured pressure is measured at a measurement point downstream of a cooler of the coolant system.

11. An aircraft propulsion system comprising a generator according to claim 1.

12. An aircraft comprising an aircraft propulsion system, the aircraft propulsion system comprising a generator according to claim 1.

* * * * *